US012644807B2

(12) United States Patent
He et al.

(10) Patent No.: US 12,644,807 B2
(45) Date of Patent: Jun. 2, 2026

(54) DUAL-DIRECTION SYNCHRONOUS LOADING METHOD FOR TRUE-TRIAXIAL TEST APPARATUS

(71) Applicant: Northeastern University, Shenyang City (CN)

(72) Inventors: Benguo He, Shenyang City (CN); Xiating Feng, Shenyang City (CN); Jie Wang, Shenyang City (CN); Rongli Zhen, Shenyang City (CN); Hongpu Li, Shenyang City (CN); Mian Tian, Shenyang City (CN); Zhibin Yao, Shenyang City (CN)

(73) Assignee: NORTHEASTERN UNIVERSITY, Shenyang City (CN)

( * ) Notice: Subject to any disclaimer, the term of this patent is extended or adjusted under 35 U.S.C. 154(b) by 402 days.

(21) Appl. No.: 18/546,401

(22) PCT Filed: Feb. 23, 2023

(86) PCT No.: PCT/CN2023/077763
§ 371 (c)(1),
(2) Date: Aug. 14, 2023

(87) PCT Pub. No.: WO2024/040895
PCT Pub. Date: Feb. 29, 2024

(65) Prior Publication Data
US 2024/0248018 A1 Jul. 25, 2024

(30) Foreign Application Priority Data
Aug. 25, 2022 (CN) .......................... 202211024477.4

(51) Int. Cl.
*G01N 3/08* (2006.01)

(52) U.S. Cl.
CPC ....... *G01N 3/08* (2013.01); *G01N 2203/0208* (2013.01); *G01N 2203/0256* (2013.01)

(58) Field of Classification Search
CPC ...................................................... G01N 3/08
See application file for complete search history.

(56) References Cited

U.S. PATENT DOCUMENTS

2021/0140861 A1 5/2021 Zhang et al.
2021/0285858 A1* 9/2021 Lu ............................ G01N 3/36

FOREIGN PATENT DOCUMENTS

CN          1865910 A    11/2006
CN      102230863 A    11/2011
(Continued)

OTHER PUBLICATIONS

Wang et al. "Synchronous clamping control of marine umbilical cable tensioner" Proceedings of the Institution of Mechanical Engineers, Part C: Journal of Mechanical Engineering Science vol. 227, Issue 10. Oct. 2013. (Year: 2013).*
(Continued)

*Primary Examiner* — Kristina M Deherrera
*Assistant Examiner* — Jean F Morello
(74) *Attorney, Agent, or Firm* — MUNCY, GEISSLER, OLDS & LOWE, P.C.

(57) ABSTRACT

A dual-direction synchronous loading method for a true-triaxial test apparatus includes the following steps: Step S1, loading a sample and adjusting the sample at a center of a sample box and a rigid loading frame; Step S2, setting parameters and sending action instructions through a computer control panel; and Step S3, collecting load signals collected by each sensor acquired by a PID controller, and coordinating a size of triaxial dual-direction loading loads to realize a single instruction dual-direction synchronous loading. The method ensures that a rock sample is kept at a (Continued)

center of a pressure chamber before being loaded, so that a focus of a loading axis is always at a same position as a center of the sample in space, and the function of synchronous loading of two loading actuators in the same direction under a single instruction can be achieved.

6 Claims, 5 Drawing Sheets

(56)                    References Cited

FOREIGN PATENT DOCUMENTS

| CN | 103969107 A | 8/2014 |
|----|-------------|--------|
| CN | 108344648 A | 7/2018 |
| CN | 108426768 A | 8/2018 |
| CN | 108548942 A | 9/2018 |
| CN | 109406310 A | 3/2019 |
| CN | 109406311 A | 3/2019 |
| CN | 110411842 A | 11/2019 |
| CN | 110618030 A | 12/2019 |
| CN | 110987638 A | 4/2020 |
| CN | 110987673 A | 4/2020 |
| CN | 216349983 U | 4/2022 |
| CN | 115389322 A | 11/2022 |
| JP | 2015169578 A | 9/2015 |
| WO | 2020134576 A1 | 7/2020 |

OTHER PUBLICATIONS

English translation of CN110618030, accessed from iq.ip.com.*

* cited by examiner

DUAL-DIRECTION SYNCHRONOUS LOADING METHOD FOR TRUE-TRIAXIAL TEST APPARATUS

BACKGROUND OF THE INVENTION

1. Field of the Invention

The invention relates to the technical field of indoor tests for rock mechanics, and particularly relates to a dual-direction synchronous loading method for a true-triaxial test apparatus.

2. The Prior Arts

With the rapid development of the world economy today, mineral resources in the shallow part of the Earth are gradually depleted, and the resource development direction gradually tends to the deep part of the Earth. Besides, hydraulic engineering, tunnel engineering, underground laboratories and the like are all facing challenges from large burial depths and high geostress to construction safety. With continuous extension of underground projects to the deep parts and the increasing scale of the projects, the rock mechanics problems involved become more and more complex, and engineering disasters occur frequently, thereby resulting in heavy casualties and equipment damage. Rock burst accidents often occur, such as the Heggura Highway Tunnel in Norway, the Kodar Lead Zinc Silver Mine in northern Idaho, and the Tongyu Tunnel, the Tianshengqiao Hydropower Station headrace tunnel, the Hongtoushan Copper Mine, and the Dongguashan Copper Mine in China.

In view of the above engineering problems, domestic and foreign scholars have invested a lot of energy in the research related to Rock mechanics, and developed many related instruments used in the indoor tests for the rock mechanics from the earliest uniaxial compression instrument, the conventional triaxial compression instrument, to the current true-triaxial test apparatus, and the disturbance true-triaxial test apparatus. With the continuous updating of test apparatuses, experts and scholars have solved a lot of engineering problems through indoor tests, and had more new understanding of relevant theories of the rock mechanics.

In order to restore the initial stress state of rocks before the excavation of engineering rock masses, the true-triaxial test apparatus is required to minimize the impact on the rocks during the stress loading process, such as uneven stress and eccentric loading. Most of these phenomena are due to the fact that a rock sample is not kept in the center of a pressure chamber before loading, or two actuators in the same direction are not loaded at the same rate. The fundamental reason lies in that the two actuators in the same direction are independent in the process of sample alignment or stress loading of the current triaxial test apparatus, and need to set and control parameters separately. In order to accurately complete the above work, there is a high requirement on the accuracy of the operation of the test personnel. For this reason, a dual-direction synchronous loading system and method for a true-triaxial test apparatus are provided, which can ensure that the rock sample is kept at a center of the pressure chamber before loaded, so that a focus of the loading axis is always at a same position with a center of the sample, the function of synchronous loading of the two actuators in the same direction under a single instruction can be achieved, the test accuracy can be ensured, and the probability of test failure caused by improper operation of the test personnel can be greatly reduced.

SUMMARY OF THE INVENTION

Two actuators in the same direction of the existing triaxial test apparatus are independent and need to set and control parameters separately, and thus it is difficult to accurately complete the sample centering or stress loading. The invention provides a dual-direction synchronous loading method for a true-triaxial test apparatus to realize the function of synchronous loading of the two actuators in the same direction under a single instruction, ensure the test accuracy, and greatly reduce the probability of test failure caused by improper operation of the test personnel.

In order to realize the purpose, the invention provides the following technical solution:

The dual-direction synchronous loading method for a true-triaxial test apparatus comprises the following steps:

Step S1, loading a sample and adjusting the sample at a center of a sample box and a rigid loading frame;

Step S2, setting parameters and sending action instructions through a computer control panel; and Step S3, by a PID controller, collecting load signals collected by each sensor, and coordinating a size of triaxial dual-direction loading loads to realize a single instruction dual-direction synchronous loading.

In Step S1, axes of the sample, the sample box, and of the rigid loading frame are arranged collinearly.

Step S2 specifically comprises: selecting a loading manner through the computer control panel, inputting loading rates and target load values in X, Y, and Z directions, and then sending the action instructions.

The sensors in Step S3 are load sensors, which are respectively arranged in the X, Y, and Z directions.

Two load sensors are arranged in a same direction, which means an $X_1$ direction load sensor and an $X_2$ direction load sensor are installed in the X direction, a $Y_1$ direction load sensor and a $Y_2$ direction load sensor are installed in the Y direction, and a $Z_1$ direction load sensor and a $Z_2$ direction load sensor are installed in the Z direction.

Step S3 specifically comprises: in order to achieve the single instruction dual-direction synchronous loading, connecting two loading actuators on a same axis in series by an iADA voltage amplification module and an iDCA signal integration module; sending loading instructions by a computer to one of the two loading actuators on the same axis; at this time, a PID controller I receives an electrical signal I, and controls an electro-hydraulic servo valve to activate the loading actuator to perform a loading action, and the load sensor records data in real-time and feedbacks the data to the PID controller I, thereby achieving a closed-loop control of one direction on the same axis; at the same time, the electrical signal I is amplified into an electrical signal II by the iADA voltage amplification module, and the electrical signal II is integrated by the iDCA signal integration module and then transmitted to a PID controller II; the PID controller II controls another electro-hydraulic servo valve to activate another loading actuator on the same axis to perform another loading action; the other load sensor records data in real-time and feedbacks the data to the PID controller II, thereby achieving a closed-loop control of another direction on the same axis; and further thereby achieving the single instruction dual-direction synchronous loading.

The PID controller I and the PID controller II adopt a fully digital controller with a model of DOli EDC I50; and a model of the electro-hydraulic servo valves is MOOG G761 or MOOG D633.

The technical effects of the present invention are:

The dual-direction synchronous loading method for a true-triaxial test apparatus according to the invention can ensure that a rock sample is kept at a center of the pressure chamber before loaded, so that a focus of a loading axis is always at a same position as a center of the sample in space, and the function of synchronous loading of the two loading actuators in the same direction under a single instruction can be achieved, the test accuracy can be ensured, and the probability of test failure caused by improper operation of the test personnel can be greatly reduced.

Figure 1:
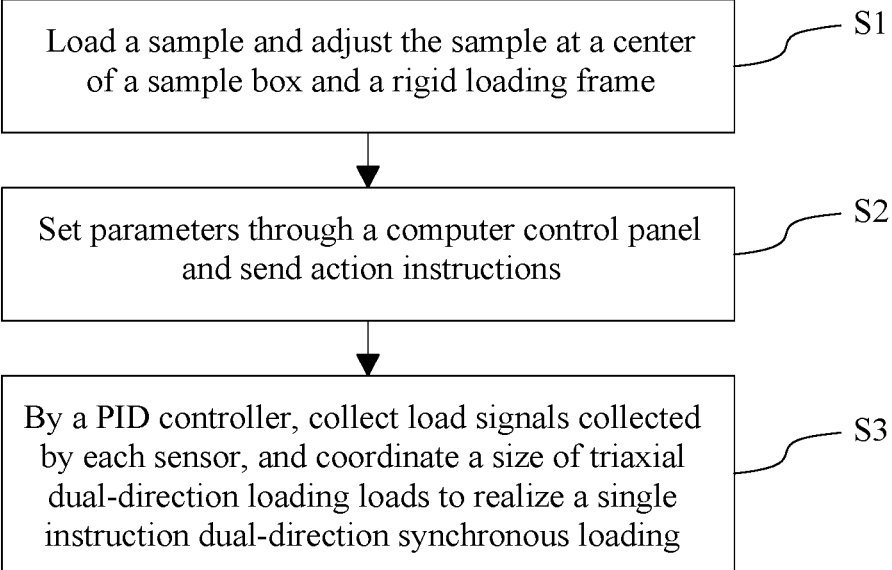
FIG. 1 is an implementation flowchart of a dual-direction synchronous loading method for a true-triaxial test apparatus according to the invention.

In the drawings, 1: benchmark platform; 2: horizontal loading system; 3: vertical loading system; 4: sample box; 5: lower limiting ring; 6: guide rail limiting block; 7: $X_1$ direction loading actuator; 8: $X_1$ direction cylinder valve block; 9: $X_1$ direction electro-hydraulic servo valve; 10: $Y_1$ direction loading actuator; 11: $Y_1$ direction cylinder valve block; 12: load sensor connection plug; 13: guide column; 14: upper limiting ring; 15: $Z_2$ direction electro-hydraulic servo valve; 16: $Z_2$ direction cylinder valve block; 17: $Z_2$ direction loading actuator; 18: $Z_2$ direction load sensor; 19: guide rail; 20: lifting cylinder; 21: lifting valve seat; 22: $Z_1$ direction loading actuator; and 23: $Z_1$ direction electro-hydraulic servo valve.

DETAILED DESCRIPTION OF THE PREFERRED EMBODIMENT

The invention will be further described in detail with reference to drawings and embodiments.

In the embodiments, a true-triaxial test apparatus disclosed in Chinese patent publication No. CN 110987673A is used as a loading device.

Figure 2:
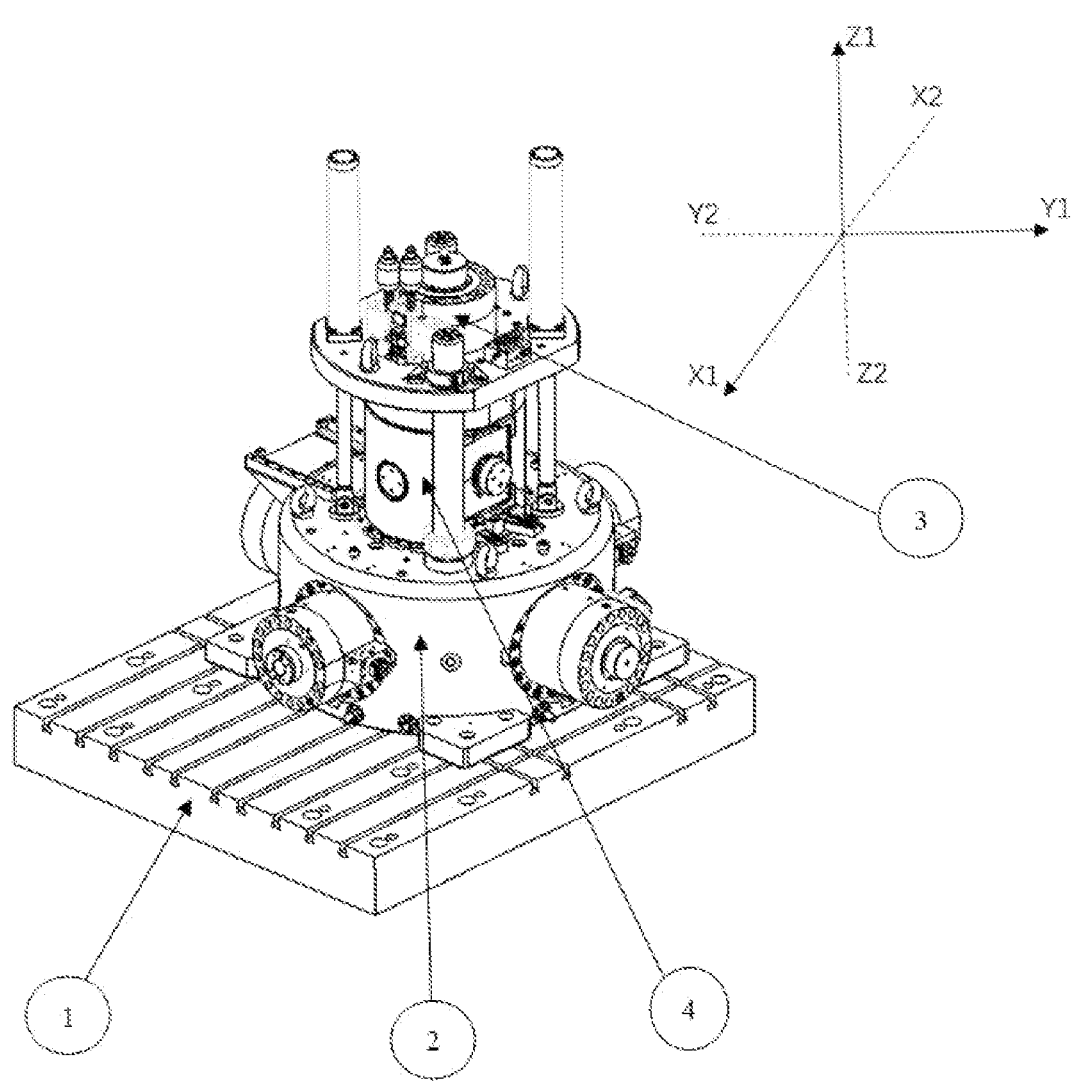
FIG. 2 is a schematic diagram of a rigid loading frame according to the invention.

As shown in FIG. 2, the true-triaxial test apparatus comprises a rigid loading frame, a synchronous loading module, an automatic data acquisition module, a benchmark platform 1, and a horizontal loading system 2 and a vertical loading system 3 which are sequentially installed on the benchmark platform 1, wherein the rigid loading frame is arranged according to a spatial right-angle coordinate system, and the three axes are divided into six directions namely $X_1$, $X_2$, $Y_1$, $Y_2$, $Z_1$ and $Z_2$ directions; each direction corresponds to one loading actuator; the loading actuators in the six directions can freely move in a straight line in respective directions, and a focus of the loading axes is always at a same spatial position as a center of a sample; the horizontal loading system 2 is used to determine the position of a sample box 4 in the X and Y directions, while the vertical loading system 3 is used to determine the position of the sample box 4 in the Z direction.

The calibration sample box 4 used to determine the center position is installed between the horizontal loading system 2 and the vertical loading system 3; the sample box 4 consists of two half boxes namely an upper half box and a lower half box which are buckled together to form a complete sample box 4; the position of the sample box 4 in the X and Y directions is limited by a guide rail 19 and a guide rail limiting block 6 in the horizontal loading system 2; the sample box 4 is a cube with an internal space, and center positions of six faces of the cube are respectively equipped with a disk; the area of each disk is adapted to the cross-section area of the corresponding loading actuator.

Figure 3:
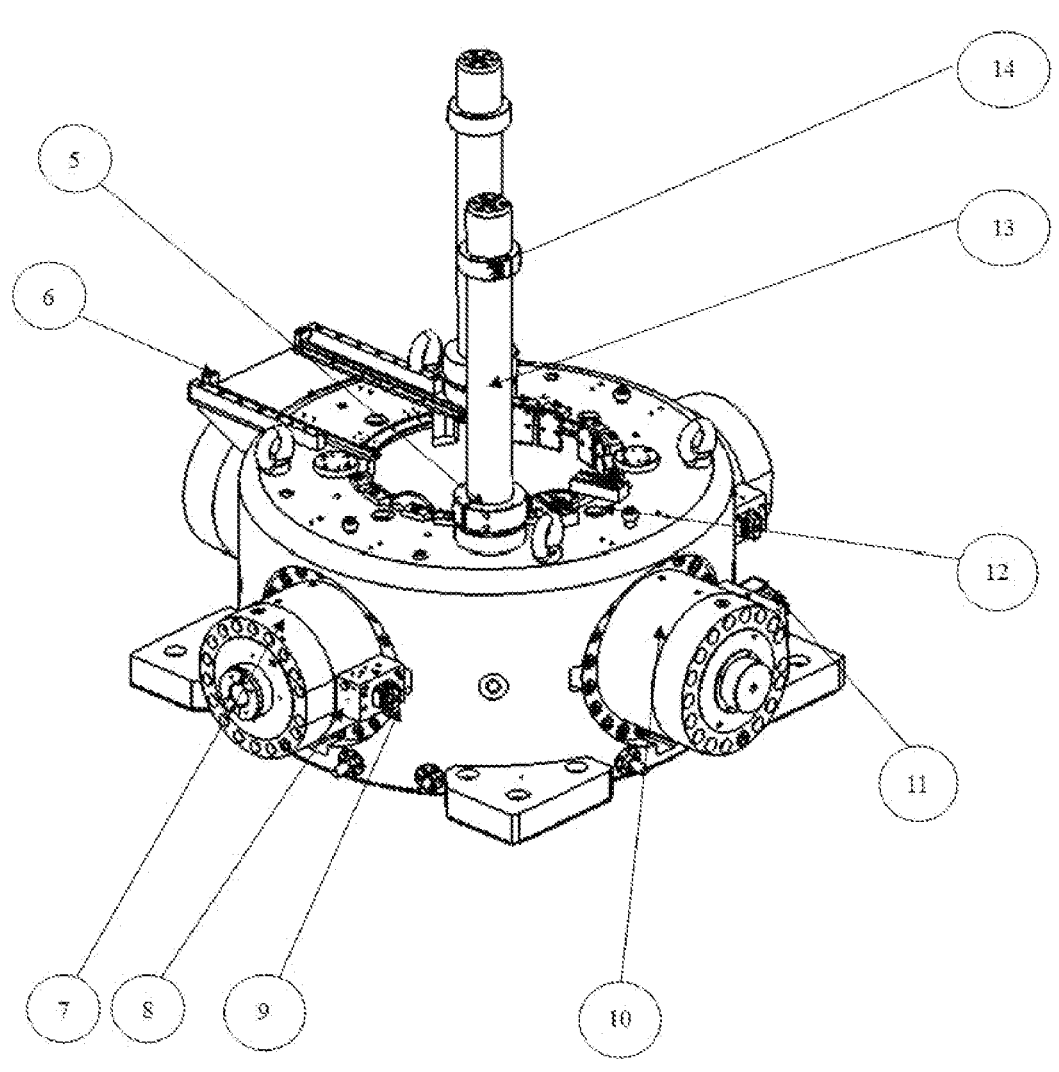
FIG. 3 is a schematic diagram of a horizontal loading frame according to the invention.

As shown in FIG. 3, a horizontal loading frame of the horizontal loading system 2 is provided with an $X_1$ direction loading actuator 7, an $X_2$ direction loading actuator, a $Y_1$ direction loading actuator 10, a $Y_2$ direction loading actuator, an $X_1$ direction load sensor, an $X_2$ direction load sensor, a $Y_1$ direction load sensor, a $Y_2$ direction load sensor, a load sensor connection plug 12, and a guide column 13, wherein an upper limiting ring 14 and a lower limiting ring 5 are installed on the guide column 13, and used to limit the position of the sample box 4 in the Z direction; the $X_1$ direction loading actuator 7 is provided with an $X_1$ direction cylinder valve block 8 and an $X_1$ direction electro-hydraulic servo valve 9; the $X_2$ direction loading actuator is provided with an $X_2$ direction cylinder valve block and an $X_2$ direction electro-hydraulic servo valve; the $Y_1$ direction loading actuator 10 is provided with a $Y_1$ direction cylinder valve block 11 and a $Y_1$ direction electro-hydraulic servo valve; the $Y_2$ direction loading actuator is provided with a $Y_2$ direction cylinder valve block and a $Y_2$ direction electro-hydraulic servo valve; the $Z_1$ direction loading actuator 22 is provided with a $Z_1$ direction cylinder valve block and a $Z_1$ direction electro-hydraulic servo valve 23; the $Z_2$ direction loading actuator 17 is provided with a $Z_2$ direction cylinder valve block 16 and a $Z_2$ direction electro-hydraulic servo valve 15.

Figure 4:
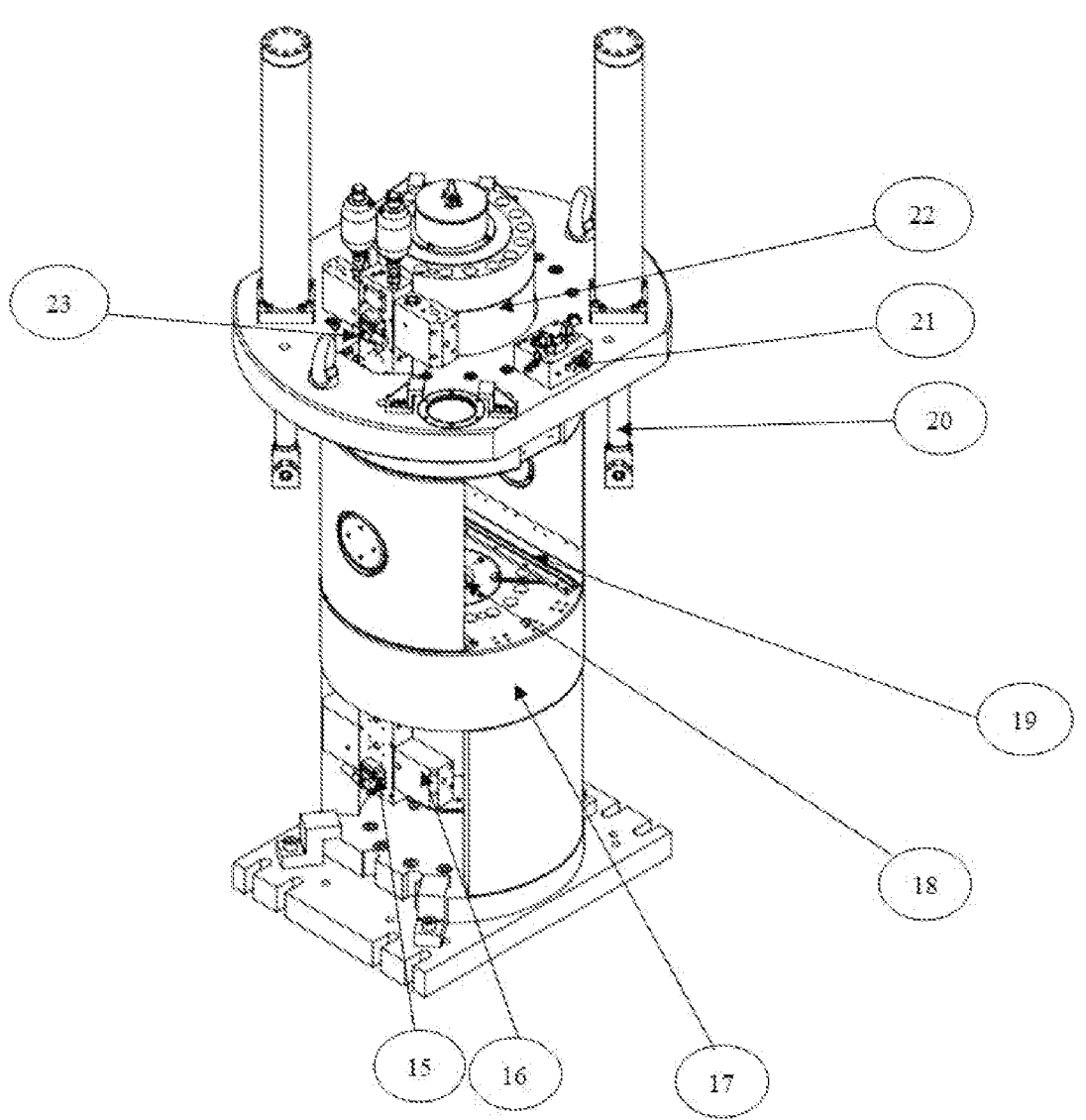
FIG. 4 is a position diagram of a vertical loading frame according to the invention.

As shown in FIG. 4, a vertical loading frame of the vertical loading system is provided with the $Z_1$ direction loading actuator 22, the $Z_2$ direction loading actuator 17, a $Z_1$ direction load sensor, and a $Z_2$ direction load sensor 18; the vertical loading frame can be raised and lowered by controlling a lifting cylinder 20 through a lifting valve seat 21; and when unloading, the vertical loading frame rises, and when loading, the vertical loading frame lowers.

The automatic data acquisition module can perform function table type test setting, automatic calibration, automatic zero clearing, fault self-diagnosis, multi-functional soft protection, and high measurement and control accuracy, and can automatically record the magnitude of loading force in real-time, and draw a stress-strain curve.

Figure 5:
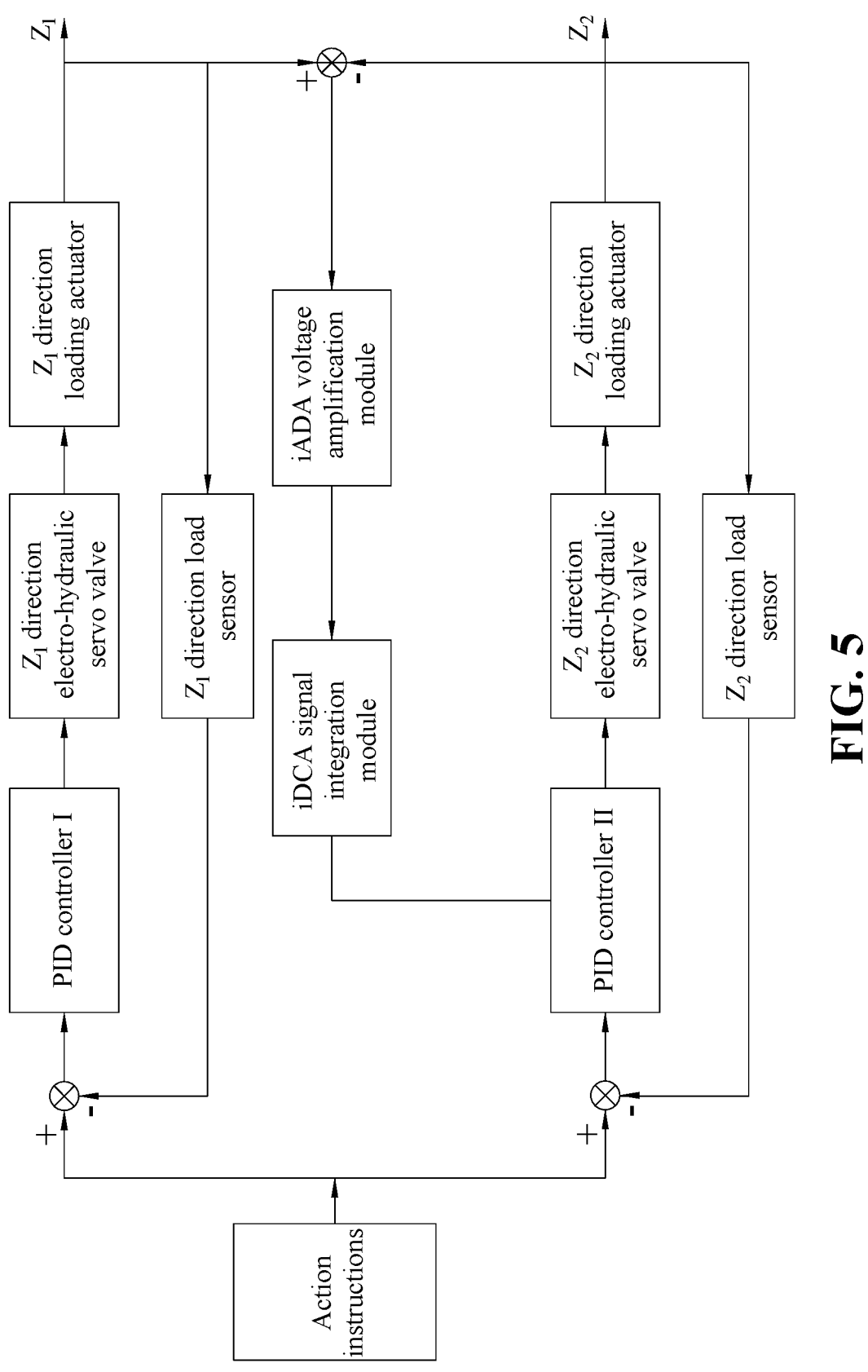
FIG. 5 is a schematic diagram of a Z-direction load synchronous control principle of the invention.

As shown in FIG. 1 and FIG. 5, the dual-direction synchronous loading method for a true-triaxial test apparatus comprises the following steps:

Step 1, loading a sample and adjusting the sample at the center of a sample box 4 and a rigid loading frame.

Placing a cube hard rock sample of 50×50×100 mm into the lower half box and adjusting the lower half box to be flush with a base to ensure that the sample is in a center of the sample box 4; covering the upper half box of the sample box 4, pushing a trolley of the sample box 4 into the rigid loading frame, and installing the guide rail limiting block 6 to fix the position of the sample box 4 to ensure that the sample box 4 is in a center of the rigid loading frame, connecting the $X_1$, $X_2$, $Y_1$, $Y_2$, $Z_1$, and $Z_2$ direction load sensors, and lowering the vertical loading frame.

Step 2, setting parameters and sending action instructions through a computer control panel.

Clicking on a POS alignment through the computer control panel to ensure that a loading actuator pressure head in each direction is just in contact with the disk of the sample box 4, then selecting a force loading mode, inputting loading rates and target loads in X, Y, and Z directions, and sending action instructions.

Step 3, by a PID controller, collecting load signals collected by each sensor, and coordinating a size of triaxial dual-direction loading loads to realize a single instruction dual-direction synchronous loading.

Specifically, the principle of dual-direction synchronous loading is shown in FIG. 5, and in the embodiment, the Z direction is used as an example: in order to achieve a single instruction synchronous loading of the $Z_1$ direction loading actuator and the $Z_2$ direction loading actuator, an iADA voltage amplification module and an iDCA signal integration module are used to connect the two loading actuators in series; besides, a computer sends loading instructions to a $Z_1$ direction loading actuator 22 in the $Z_1$ direction, and a PID controller I receives a 20 mv electrical signal; the PID controller I controls a $Z_1$ direction electro-hydraulic servo valve 23 to actuate the Z direction loading actuator 22 to perform a loading action, the $Z_1$ direction load sensor records data in real-time and feedbacks the data to the PID controller I, thereby achieving a closed-loop control of the $Z_1$ direction; besides, the $Z_1$ signal is amplified to ±10 v through the iADA voltage amplification module, and then integrated by the iDCA signal integration module and then transmitted to a PID controller II; the PID controller II controls the $Z_2$ direction electro-hydraulic servo valve 15 to actuate the $Z_2$ direction loading actuator 17 to perform a loading action, and the $Z_2$ direction load sensor 18 records data in real-time and feedbacks the data to the PID controller II, thereby achieving a closed-loop control of the $Z_2$ direction; and at the same time, further thereby achieving one signal controls a synchronous loading of the $Z_1$ direction loading actuator 22 and the $Z_2$ direction loading actuator, and the same signal will not affect the control of the PID controller I and the PID controller II on the two loading actuators, respectively.

The iADA voltage amplification module has four independent ±10V, 24-bit analog inputs; 4 independent ±10V, 16-bit analog outputs; +5 VDC power supply for analog potentiometer; +24 VDC power supply; and does not have ±2 VDC input.

The iDCA signal integration module is used for an analog measurement amplification module, with a 10V DC excitation voltage for a DC powered sensor; signal-to-noise ratio SNR91 dB@1 ms filtering; and 10 ppm/k temperature drift, and the input signal range is ±5 mV to ±10 mV, and the amplification rate is adjustable.

The PID controller I and the PID controller II adopt a fully digital controller with a model of DOli EDC I50; and a model of the electro-hydraulic servo valves is MOOG G761 or MOOG D633.

Although the invention has been disclosed in preferred embodiments, the embodiments do not limit the invention. Any equivalent changes or modifications made without departing from the spirit and scope of the invention also fall within the scope of protection of the invention. Therefore, the scope of protection of the invention should be based on the content defined in the claims of the application.

What is claimed is:

1. A dual-direction synchronous loading method for a true-triaxial test apparatus, comprising the following steps:

Step S1, loading a sample and adjusting the sample at a center of a sample box and a rigid loading frame;

Step S2, setting parameters and sending action instructions through a computer control panel; and Step S3, by a PID controller, collecting load signals collected by each sensor, and coordinating a size of triaxial dual-direction loading loads to realize a single instruction dual-direction synchronous loading, wherein Step S3 specifically comprises:

in order to achieve the single instruction dual-direction synchronous loading, connecting two loading actuators on a same axis in series by an iADA voltage amplification module and an iDCA signal integration module;

sending loading instructions by a computer to one of the two loading actuators on the same axis;

wherein at this time, a PID controller I receives an electrical signal I, and controls an electro-hydraulic servo valve to activate the loading actuator to perform a loading action, and the sensor records data in real-time and feedbacks the data to the PID controller I, thereby achieving a closed-loop control of one direction on the same axis;

at the same time, the electrical signal I is amplified into an electrical signal II by the iADA voltage amplification module, and the electrical signal II is integrated by the iDCA signal integration module and then transmitted to a PID controller II;

the PID controller II controls another electro-hydraulic servo valve to activate another loading actuator on the same axis to perform another loading action;

the other sensor records data in real-time and feedbacks the data to the PID controller II, thereby achieving a closed-loop control of another direction on the same axis;

and further thereby achieving the single instruction dual-direction synchronous loading.

2. The dual-direction synchronous loading method according to claim 1, wherein in Step S1, axes of the sample, the sample box, and the rigid loading frame are arranged collinearly.

3. The dual-direction synchronous loading method according to claim 1, wherein Step S2 specifically comprises: selecting a loading manner through the computer control panel, inputting loading rates and target load values in X, Y, and Z directions, and then sending the action instructions.

4. The dual-direction synchronous loading method according to claim 1, wherein the sensors in Step S3 are load sensors, which are respectively arranged in the X, Y, and Z directions.

5. The dual-direction synchronous loading method according to claim 4, wherein two load sensors are arranged in a same direction, which means an $X_1$ direction load sensor and an $X_2$ direction load sensor are installed in the X direction, a Y direction load sensor and a $Y_2$ direction load sensor are installed in the Y direction, and a $Z_1$ direction load sensor and a $Z_2$ direction load sensor are installed in the Z direction.

6. The dual-direction synchronous loading method according to claim 1, wherein the PID controller I and the PID controller II adopt a fully digital controller with a model of DOli EDC I50; and a model of the electro-hydraulic servo valves is MOOG G761 or MOOG D633.

* * * * *